(12) United States Patent
Kolbe

(10) Patent No.: US 6,386,028 B2
(45) Date of Patent: May 14, 2002

(54) PRESSURE MONITOR

(75) Inventor: Geoffrey Kolbe, Newcastleton (GB)

(73) Assignee: Border Barrels Limited, Newcastleton (GB)

( * ) Notice: Subject to any disclaimer, the term of this patent is extended or adjusted under 35 U.S.C. 154(b) by 0 days.

(21) Appl. No.: 09/780,102

(22) Filed: Feb. 9, 2001

(51) Int. Cl.⁷ .............................................. B64D 1/04
(52) U.S. Cl. ...................................................... 73/167
(58) Field of Search ................................ 73/35.16, 167

(56) References Cited

U.S. PATENT DOCUMENTS

| | | | | |
|---|---|---|---|---|
| 3,014,368 A | * | 12/1961 | Musser et al. | 73/167 |
| 3,100,394 A | * | 8/1963 | Musser et al. | 73/167 |
| 3,260,107 A | * | 7/1966 | Rosen | 73/167 |
| 5,918,304 A | * | 6/1999 | Gartz | 73/167 |

OTHER PUBLICATIONS

Jamison, Rick. "Oehler's Wizardry." Online posting. Dec. 17. 1999. Oehler Research, Inc. (http://oehler–research.com/model43.html).

"Fabrique Scientific Peak Strain Meter."Online posting. Dec. 17, 1999. Fabrique Scientific Inc., U.S.A. (http://www.mcs.net/~sfaber/specs.htm).

"Measure Chamber Pressure."Online posting. Dec. 17, 1999. Fabrique Scientific Inc., USA. (http://www.mcs.net/~sfaber/stmme.htm).

"Peak Strain Meter."Online posting. Dec. 17, 1999. Fabrique Scientific Inc., USA. (http://www.mcs.net/~sfaber/meterpic.htm).

* cited by examiner

Primary Examiner—Robert Raevis
(74) Attorney, Agent, or Firm—Robert B. Hughes; Hughes Law Firm PLLC

(57) ABSTRACT

The present invention provides an peak chamber pressure measuring apparatus 1 for use with a regular firearm 2 using a given ammunition. The apparatus comprises: a piezoelectric accelerometer 3 for generating a recoil acceleration electrical output signal from recoil acceleration of the firearm upon discharge thereof, and provided with releasable mounting means 6 for rigidly securing the accelerometer 3 to the firearm 2 in proximity to its chamber 11. The accelerometer 3 has signal output means 12 coupled to a signal processing means 13. The signal processing means 13 converts said recoil acceleration electrical output signal which is representative of the peak chamber pressure, using a conversion relationship based on the mass of each of the firearm, and the projectile and the propellant components of the ammunition, and the firearm bore diameter, the signal processing means 13 having signal output means for connection to output signal display means 16.

25 Claims, 3 Drawing Sheets

PRESSURE MONITOR

RELATED APPLICATIONS

The present application is based on, and claims foreign priority benefits of Great Britain application number 0002901.7, which was filed on Feb. 10, 2000.

The present invention relates to a method and apparatus for measuring the pressure in a firearm during discharge thereof.

To date a large variety of methods and apparatus have been used to measure and/or calculate the peak chamber pressure within a firing chamber of a firearm when it is being discharged to fire off a bullet or other projectile. Measurement of chamber pressure allows for example a custom-made ammunition "load" (or hand load) to be compared with a factory-made load. It also allows the development of accurate hand loads by measuring the pressure uniformity generated within a firing chamber and or to measure the temperature sensitivity of loads in order to avoid problems with temperature extremes and to maintain the accuracy or even to assist in choosing the best powder for a given application by determining the efficiency, pressure uniformity and temperature stability. These factors are a few among the many for which it is generally necessary to measure chamber pressure.

Furthermore, where custom-made ammunition is to be used, measurement of the peak chamber pressure is advisable to ensure that the load is not too "hot" i.e. creates excessive chamber pressures which would seriously reduce the life-time of the barrel of the firearm, in addition to increasing the risk of a catastrophic failure of the barrel through excessive forces being exerted therein.

The custom manufacture of ammunition or hand loading is a relatively cheap method of obtaining ammunition and offers a wide variety of combinations of casings, powders and bullets which may not otherwise be available e.g. as a commercial product. As previously mentioned, it is generally considered good practice, in addition to considering the safety aspect, to ensure that the load is not too "hot". This can be done by measuring the chamber pressure during discharge of the firearm firing off a sample.

Prior art devices for measuring and/or deriving the chamber pressure include the well-known "Powley P Max" device as marketed by Homer Powley in the 1960's. The Powley P Max device generally takes the form of a tube which is attached to a rifle using the mountings normally provided for attachment of telescopic sights thereto. A freely movable weight of known mass is located adjacent a crushable lead disc fixed within the tube. Upon discharge of the rifle, the rifle, the tube and the crushable lead disc therein all recoil. The freely movable weight, however, tends to remains stationary and crushes the lead disc within the tube as the recoiling lead disc is driven against the weight. The crushable lead disc is calibrated to allow a user to derive the force (peak pressure) which has acted upon the lead disc to crush it. This method of deriving the peak chamber pressure is limited in that it does not provide accurate or precise values for the peak chamber pressure, nor does it provide any data for the chamber pressure variation throughout a discharge of the firearm.

Other devices used include strain gauges such as the Oehler Model 43 which is a small strain gauge glued to the barrel over the firing chamber of a gun. Discharge of the gun causes the barrel around the firing chamber to expand momentarily and the strain gauge measures the expansion of the barrel which then allows a user to derive the peak pressure within the firing chamber from the measured expansion of the gun barrel. The strain measured on the barrel is proportional to the chamber pressure and can be used either as a relative pressure indication, or, an absolute pressure can be calculated using a pressure vessel formula.

Use of a strain gauge of this type requires a user accurately to measure both the inside and outside diameters of the chamber area of the gun at the gauge location. The use of the glue and the surface preparation of the gun surface which is required to attach the strain gauge thereto is likely to mar the bluing of the gun. For some users, this marring of the surface of the gun in addition to the requirements for obtaining accurate measurement of the firing chamber, is not acceptable. Furthermore, the requirement for having to attach the gauge to the barrel, means that it is difficult or even impossible to attach the strain gauge and any lead wires (going to a display meter) to some semi-automatic pistols.

The chamber pressure in a firearm is also measurable directly by use of specialised firearms which have been adapted or constructed solely for this purpose. Specialised firearms of this type generally have the firing chamber formed and arranged with a pressure meter attached or built directly thereinto in order to allow direct measurement of the chamber pressure. These specialised firearms can be expensive and are of limited value to a non-commercial interest such as an ammunition hobbyist.

It is also possible to modify standard firearms to allow direct measurement of the chamber pressure. Such a modification would comprise drilling a small hole into the firing chamber and attach a pressure measuring device over the hole. Discharging the weapon allows direct measurement of the chamber pressure. This destructive method is generally highly undesirable for obvious reasons.

More primitive and less precise or accurate methods of deriving the chamber pressure include affixing the firearm to a freely movable carriage to which a stylus is attached. Discharge of the firearm causes the carriage to recoil which draws the stylus across a high speed (approximately 10,000 r.p.m.) rotating cylinder which records the movement of the stylus thereacross. The acceleration of the carriage (plus firearm) can be calculated and therefore the force of imparted by the recoil of the carriage. Use of apparatus of this type requires that there be little or no vibrations near the apparatus during the test, as these would be detected by the stylus and would be prejudicial to the accuracy and precision of the results of the experiment.

It is an object of the present invention to minimise and/or obviate one or more of the foregoing problems of the prior art.

The present invention provides an apparatus suitable for use in measuring the peak chamber pressure of a given firearm upon discharge of said firearm using a given ammunition, which apparatus comprises:

a piezoelectric accelerometer for generating a recoil acceleration electrical output signal from recoil acceleration of the firearm upon discharge thereof, said accelerometer being provided with releasable mounting means formed and arranged for rigidly securing said accelerometer to said firearm in proximity to the chamber of the firearm, said accelerometer having signal output means;

a signal processing means;

first signal transmission means for transmitting said electrical output signal from said accelerometer signal output means to said signal processing means;

said signal processing means being formed and arranged to convert said recoil acceleration electrical output signal from the accelerometer to a second signal output which is representative of the peak chamber pressure, using a conversion relationship based on the mass of each of the firearm, and the projectile and the propellant components of the ammunition, and the firearm bore diameter, said signal processing means having signal output means for connection, in use of the device, to output signal display means.

Thus the apparatus of the present invention provides an effective means for readily determining the peak chamber pressure during discharge of a firearm without the need to resort to any destructive modifications to the firearm.

The firearm may be any regular handgun or rifle which is generally a commercial handgun or rifle which has not been specially constructed for the purpose of measurement of gun acceleration or chamber pressure.

The piezoelectric accelerometer mounting means is conveniently formed and arranged for releasable attachment to a telescopic sight mount provided on said firearm. Advantageously, though, the mounting means is formed and arranged for releasable attachment to the telescopic sight so that the firearm can be used in the normal way with the telescopic sight so that other aspects of the performance of the firearm and ammunition, such as grouping of a series of test discharges, can be effectively monitored at the same time.

Other possible mounting arrangements include those formed and arranged for attachment to the trigger guard, or to an iron back sight (as generally used on target rifles) or to an iron back sight mount provided on the firearm. In general it is preferred that the accelerometer should be mounted at the rear of any supporting body i.e. at that side which faces in the direction of the recoil. Nevertheless it is also possible for the accelerometer to be mounted to one side or to the front of a supporting body.

Various forms of mounting means may be used. Where the accelerometer is mounted using a telescopic or other gunsight mounting then the mounting means conveniently comprises a connector substantially similar to that used to mount a telescopic or other gunsight on said mounting. In other cases the mounting means is conveniently in the form of a clamp with releasable fasteners such as screws, bolts, can lock devices etc. in order to provide a substantially secure and rigid mounting of the accelerometer. Nevertheless, especially in those cases where the accelerometer is mounted on the rear side of a supporting body so that it is pushed along by the supporting body during recoil of the firearm, then a less rigid and secure form of mounting may be employed. Thus, for example, there could be used an adhesive and/or adhesive tape, conveniently double sided adhesive tape; a securing strap, optionally elasticated; any kind of hook and loop type fastener, for example, as available under the Trade Name VELCRO™; wax, for example, candle wax or preferably, petroleum wax; a magnetic clamp; a suction clamp; or any other securing means which can be more or less readily used for releasable mounting of the accelerometer.

Preferably, the accelerometer used has an acceleration force measuring range of from 50 g to 1000 g, for example from 50 g to 600 g. It will be appreciated that the range required will depend on firearm weight and cartridge characteristics. Commercially available accelerometers of the type 8614A500M1 made by Kistler (Amherst, N.Y., USA) are suitable for use in the present invention, as are those of the type ACH-01 made by MSI Inc (Valley Forge, Pa., USA). The accelerometer for use in the present invention is desirably as small and light as practicable, for example the Kistler 8614A500M1 accelerometer weighs less than 2 grammes.

The location of the accelerometer is preferably as close to the chamber of the firearm as possible. We have found experimentally that this helps ensures that the effects of various vibrations generated in the firearm, on the accelerometer, are minimised which improves the quality of the measurements obtained by the accelerometer during discharge of the firearm. Vibrations that may arise include those from twisting and/or expansion and contraction of various components of the firearm during discharge of the firearm. Even with the accelerometer mounted as close as possible to the chamber, though, it will generally be subjected to longitudinal vibrations acting along the length of the barrel and it is therefore normally desirable for the signal processing means to include signal conditioning means such as a low pass filter to reduce the effects of such vibrations on the measurements obtained.

It is generally desirable that the accelerometer should be rigidly secured to the firearm to minimise any further unwanted vibrations which may arise from a non-rigid connection between the accelerometer and the firearm. Furthermore, a non-rigid connection may possibly also result in some degree of signal distortion of a pressure recorded with respect to time which could have a detrimental effect on the accuracy and/or precision of the derived peak chamber pressure.

The signal processing means may be implemented substantially in hardware, or partly in hardware and firmware and/or software. Thus, for example, the signal processing means may comprise a stand-alone unit connected in use of the apparatus to the accelerometer and provided with input means such as for example dials connected to variable value electronic components such as rheostats, for enabling input of firearm and ammunition parameters, and any necessary conversion factors. Alternatively the signal processing means could be substantially comprised by a personal computer or the like programmed with software for enabling input of firearm and ammunition parameters, and processing of the accelerometer signal. It will be appreciated that an apparatus according to the present invention could in principle be dedicated to a greater or lesser extent for use with a particular firearm and/or ammunition in which case the relevant parameters could be fixed or preset so that no user inputting or input means therefor is required.

Advantageously, a low pass filter is provided to remove unwanted signal components forming part of the recoil acceleration electrical signal output from the accelerometer device. Unwanted signal components may arise from, for example, vibration of various parts of the firearm during discharge thereof. Unwanted vibrations could also result from insufficiently rigid attachment of the accelerometer device of the present invention to the firearm and should generally be avoided by ensuring a secure attachment of the accelerometer. Advantageously also there is provided a "peak and hold" means to ensure that the very short duration peak chamber pressure value or other associated value provided by the signal processing means in use of the accelerometer device of the present invention is effectively captured for subsequent display thereof to a user.

In order to display the recorded maximum chamber pressure, or any other derived value obtained in use of the accelerometer device of the present invention, the signal processing means is generally connected to a suitable display. The display means may be a meter, a digital display, an LCD display or other similar such means familiar to those in the art.

The accelerometer device of the present invention is as previously mentioned hereinbelow, provided with releasable mounting means formed and arranged for rigidly securing the device to a firearm in proximity to the firing chamber thereof. The releasable mounting means is preferably in the form of the type of connectors commonly used to attach telescopic sights to a firearm via the mounting points provided therefor. The use of releasable mounting means of this type allows the accelerometer device of the present invention to be rigidly attached to a firearm with the minimum of preparation or modification to either the firearm or the accelerometer device. Other releasable mounting means apparent to the skilled person may also be used to rigidly attach the accelerometer device to a firearm.

Where the signal processing means of the accelerometer device is in the form of a personal computer programmed according to the present invention, then the data input means may be comprised by any of the normally available user input means such as a computer keyboard, mouse, touch pad, touch screen, track ball, joystick etc. Similarly the VDU monitor of the computer would normally constitute the data display means. Where a dedicated self-contained integrated signal processing means is used, the data input means and the data display means are conveniently provided together therewith in a single unit.

The conversion relationship used in the apparatus of the present invention is generally based on the mass of each of the firearm, the projectile and the propellant components of the ammunition, and the firearm bore diameter in accordance with the following formula (I):

$$V = \frac{P\pi q d^2}{4M_f} \cdot \left(\frac{M_A}{M_A + 0.5L}\right) \quad (I)$$

where

V=peak output voltage from the accelerometer;
P=peak chamber pressure;
$\pi$=3.1415;
q=sensitivity of the accelerometer;
d=bore diameter of a given firearm;
$M_f$=mass of a given firearm (including mass of all rigid attachments);
$M_A$=mass of bullet (projectile); and
L=powder mass.

The conversion relationship given by formula (I) may be used to derive a value representative of the peak chamber pressure P of a given firearm using a given ammunition during discharge of said firearm where the valves for q, d, $M_f$, $M_A$ and L are the above identified parameters which are known before discharge and V is the peak output voltage obtained during the discharge.

Rearrangement of formula (I) produces a transfer function represented by formula (II), wherein the final output voltage Vout in volts of the apparatus of the present invention is (after processing of the output voltage from the accelerometer) equivalent to the pressure P (in kilobar) or other desired units in the firing chamber of a given firearm during discharge thereof.

$$V_{OUT} = \frac{4MgV}{\pi q d^2} \cdot \frac{M_A + 0.5L}{M_A} \cdot K \quad (II)$$

where $V_{OUT}$=Output voltage of the apparatus;
K=is a constant for scaling up or down the signal obtained from processing of the accelerometer output signal in accordance with the conversion relationship, so that the display means indicates the peak chamber pressure in kilobar (or other desired units)

The present invention also provides a method of deriving the peak chamber pressure of a given firearm using a given ammunition wherein said method comprises the steps of:

(a) providing an apparatus of the present invention;
(b) rigidly securing the accelerometer of said apparatus to a said firearm in proximity to the chamber thereof;
(c) loading said firearm with a said ammunition;
(d) discharging the firearm;
(e) capturing a peak voltage output signal from the accelerometer device; and
(f) processing said output signal so as to convert it into a peak chamber pressure value.

Whilst it would normally be preferred to mount the accelerometer on the firearm prior to loading of the ammunition, the method of the present invention also encompasses a method in which the ammunition is loaded before mounting of the accelerometer.

In use of the method of the present invention, the voltage output is generally converted to a peak chamber pressure value by use of formula (II) as described hereinabove, where the peak output voltage $V_{OUT}$ is equivalent to the peak pressure P within the firing chamber.

When a given firearm is discharged in the course of use of the present invention, the firearm may either be held by a user or rigidly clamped to a freely movable trolley or carriage, conveniently located on tracks or other guide supports. When the firearm is discharged it is highly desirable that the recoil force generated thereby is not substantially attenuated by either a said user holding the firearm, or by said track mounted freely moveable carriage/trolley, during the initial "recoil" phase of the discharge where the firearm (and any rigid attachments thereto) recoils as a result of a pressure pulse created by detonation of the power charge of the ammunition.

During discharge of the firearm in use of the apparatus and method of the invention, with the firearm held by the user relatively lightly by a user, the firearm can effectively be considered "decoupled" from the user during the very short period of the pressure pulse and no account need be taken of any influence of the mass of the user in determining the peak chamber pressure.

Where a said firearm is rigidly mounted on a said freely moveable carriage or trolley, the mass of firearm in addition to the mass of the trolley would need to be included in the term Mf of formulae (I) and (II) to enable a precise derivation of the value of the peak chamber pressure where formulae (I) and/or (I) are to be used according to the present invention, and this is accordingly generally less convenient.

It will be appreciated that other more or less refined forms of the above-described formulae may also be used depending on inter alia the degree of accuracy required by the user. Further preferred features and advantages of the present invention will appear from the following detailed description given by way of example of some preferred embodiments illustrated with reference to the accompanying drawings in which.

Figure 1:
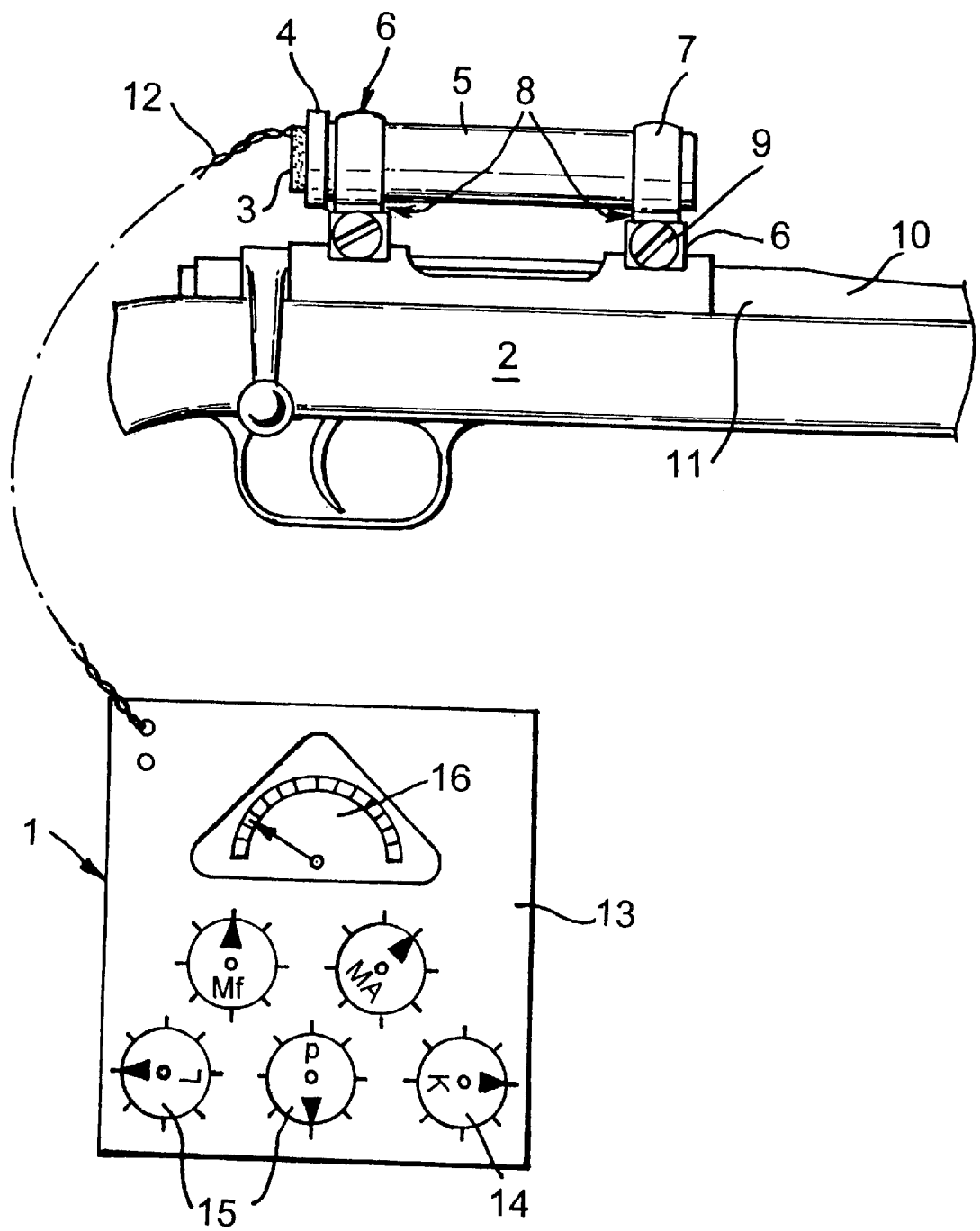
FIG. 1 is a side view of a peak chamber measuring apparatus according to a first embodiment of the present invention in use with a rifle.

FIG. 1 shows a peak chamber pressure measuring apparatus 1 according to a first embodiment of the present invention in use with a rifle 2. In more detail the apparatus 1 comprises a piezoelectric accelerometer 3 glued to a first end 4 of an aluminium tube 5. The tube 5 is rigidly attached to the rifle 2 via a conventional telescopic sight mounting 6. In more detail, the mounting 6 comprises split collars 7 with downwardly projecting dovetail section portions 8 which slidably locate on complementary section portions of the rifle. Screws 9 are used to tighten the mounting 6 in position on the rifle 2. As shown in FIG. 1 the mounting points 6 are positioned fore and aft immediately behind the firing chamber 11 part of the barrel 10.

The accelerometer 3 is connected by electrical leads 12 to a signal processing and display unit 13 which has a number of rotatable knobs 14 each of which can be set by a user to the value of a given test firing parameter of the rifle and ammunition being used such as $M_f$, $M_A$ etc where these have the same meaning as before. A knob is also provided for adjusting the scaling K of the final output voltage Vout where a multi-range display is used e.g. 0-500 bar, 0-2500 bar etc. A moving needle meter display 16 marked in kbar units is provided for displaying the peak pressure measured.

Figure 2:
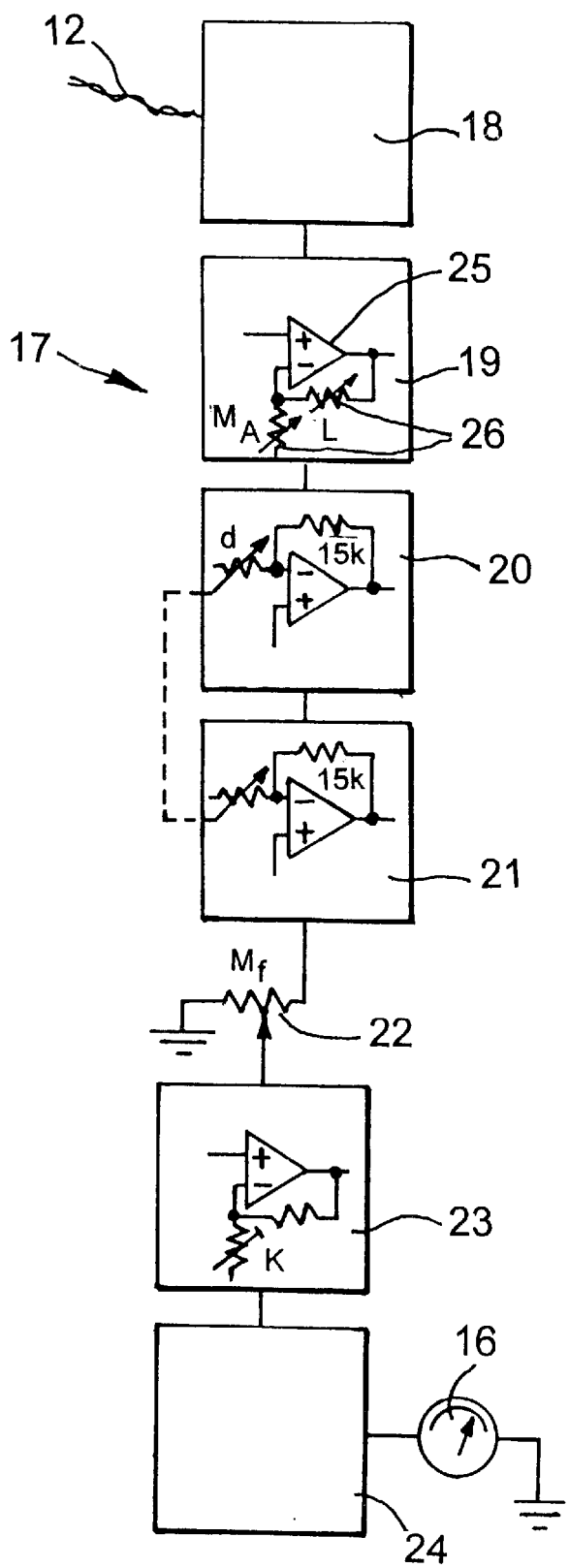
FIG. 2 is a schematic circuit diagram of the signal processing and display means of the apparatus of FIG. 1.

The signal processing circuitry 17 of the unit 13 is schematically shown in FIG. 2 and comprises a low pass Bessel filter 18 connected via a series of signal processing stages 19-22 to a scaling stage 23 and finally a peak and hold unit 24 which captures the peak output voltage Vout for display thereof on the meter display 16.

The various signal processing stages 19-22 generally comprise an amplifier 25 in which the gain is adjusted by a rheostat 26 via a respective knob 14 (see FIG. 1) according to the value of the respective parameter $M_A$, $M_f$, L etc.

In use of the apparatus, the user sets the various knobs 14 according to the values of the rifle and ammunition parameters having ascertained their values. The user then holds the rifle 2 up with a relatively light grip and fires it off. The accelerometer output signal is transmitted to the signal processing unit where it is processed and the peak value detected is captured by the Peak & Hold unit 24 and displayed on the meter display 16.

EXAMPLE 1

Measurement of Peak Chamber Pressure

A 308 calibre rifle having an average bore diameter of 0.306 inches and a total mass (including the accelerometer and its mounting) $M_f$ of 20 lbs was loaded with a 308 Winchester cartridge prepared in accordance with the following parameters: bullet mass $M_A$=150 grains, and powder mass L=45 grains. The rheostat control knobs on the signal processing unit which had been previously calibrated, were set in accordance with the above described parameter values and the rifle then discharged. A peak chamber pressure measurement of 44,100 p.s.i. (3000 bar) was obtained on the meter display.

Figure 3:
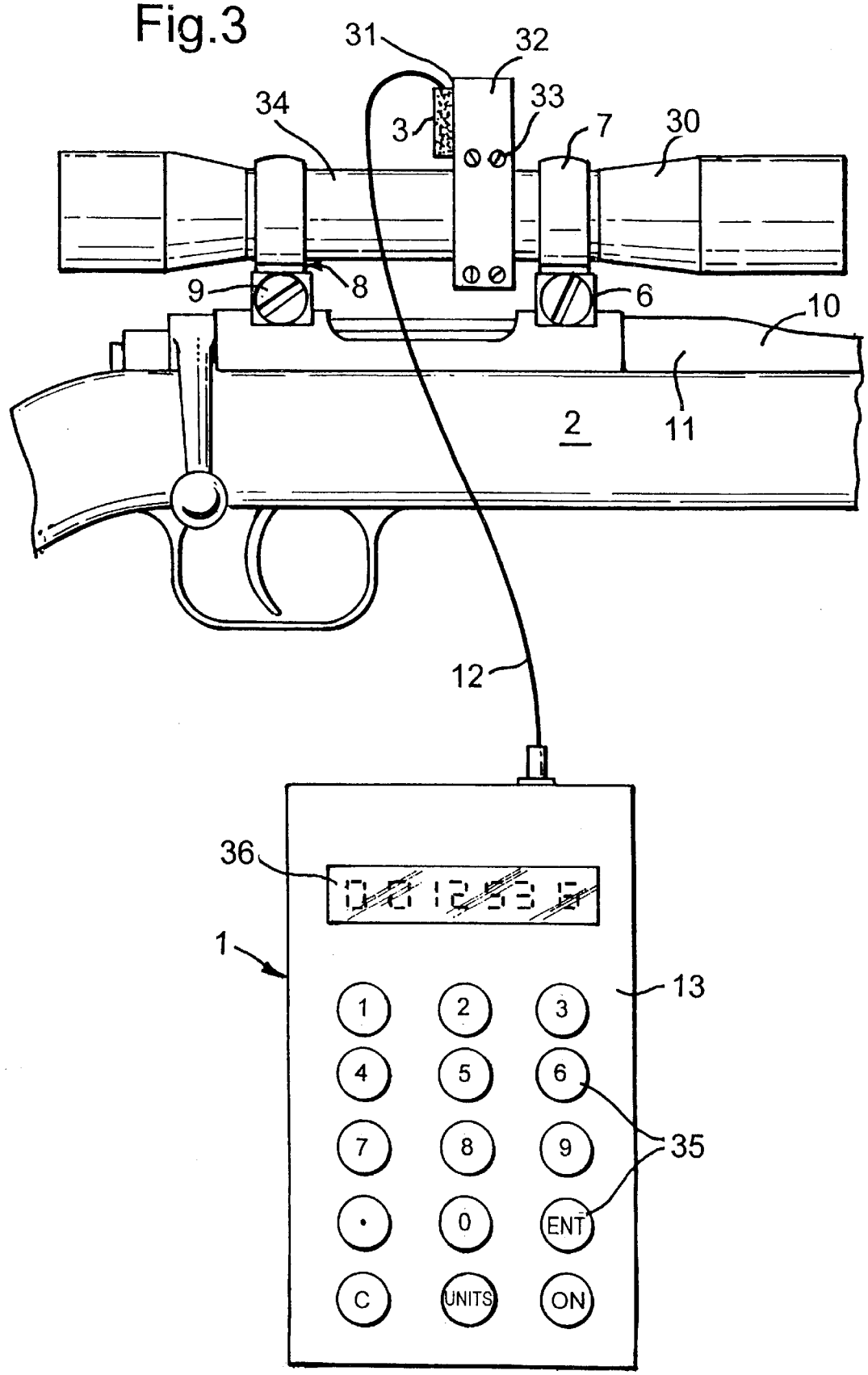
FIG. 3 is a view corresponding to that of FIG. 1 of a second apparatus of the invention.

FIG. 3 shows a modified embodiment in which like parts corresponding to those in FIG. 1 are indicated by like reference numbers. In this case the telescopic sight mounting 6 is used to mount a telescopic gun sight 30 in the normal way.

The accelerometer 3 is glued to the rear side 31 of a support body in the form of a clamp 32 which is secured with the aid of screws 33 onto a central part 34 of the telescopic gun sight 30. The signal processing and display unit 13 has input means in the form of a keypad 35 and a digital display 36 and includes a computer device programmed to allow a user to key in the required parameters, capture a peak accelerometer output signal, convert it using the above described conversion relationship into a peak chamber pressure value, and display it on the digital display 36.

What is claimed is:

1. Apparatus suitable for use in measuring the peak chamber pressure of a given firearm upon discharge of said firearm using a given ammunition, which apparatus comprises:

a piezoelectric accelerometer for generating a recoil acceleration electrical output signal from recoil acceleration of the firearm upon discharge thereof, said accelerometer being provided with releasable mounting means formed and arranged for rigidly securing said accelerometer to said firearm in proximity to the chamber of the firearm, said accelerometer having signal output means;

a signal processing means;

first signal transmission means for transmitting said electrical output signal from said accelerometer signal output means to said signal processing means;

said signal processing means being formed and arranged to convert said recoil acceleration electrical output signal from the accelerometer to a second signal output which is representative of the peak chamber pressure, using a conversion relationship based on the mass of each of the firearm, and the projectile and the propellant components of the ammunition, and the firearm bore diameter, said signal processing means having signal output means for connection, in use of the device, to output signal display means.

2. Apparatus as claimed in claim 1 wherein said piezoelectric accelerometer has an acceleration force measuring range of from 50 g to 1000 g.

3. Apparatus as claimed in claim 1 wherein said releasable mounting means is in the form of a connector for attachment of a telescopic sight to a said firearm provided with telescopic sight mounting points.

4. Apparatus as claimed in claim 1 wherein said releasable mounting means comprises a clamp formed and arranged to rigidly attach the accelerometer device to a said firearm in proximity to the firing chamber thereof.

5. Apparatus as claimed in claim 1 where said signal processing means includes signal conditioning means for reducing the effects of vibrations on the measurements obtained.

6. Apparatus as claimed in claim 5 wherein said signal conditioning means comprises a low pass filter provided to remove unwanted signal components forming part of the recoil acceleration electrical signal output from the accelerometer device.

7. Apparatus as claimed in claim 1 wherein said signal processing means comprises a computer device having input means for enabling input of firearm and ammunition parameters, and programmed with software for processing of the recoil acceleration electrical output signal.

8. Apparatus as claimed in claim 7 wherein said data input means comprises at least one of computer keyboard, mouse, touch pad, touch screen, track ball, and joystick input means.

9. Apparatus as claimed in claim 7 wherein said computer device is provided with a VDU monitor, which monitor constitutes said data display means.

10. Apparatus as claimed in claim 1 wherein said signal processing means comprises a stand-alone unit connected in use of the apparatus to the accelerometer and provided with input means for enabling input of firearm and ammunition parameters, and any necessary conversion factors.

11. Apparatus as claimed in claim 1 wherein there is provided a "peak and hold" means formed and arranged for capturing at least one of a peak recoil acceleration electrical signal output from the accelerometer device, and a peak chamber pressure value provided by said signal processing means, in use of the apparatus, for subsequent display to a user of said captured peak chamber pressure value, or a peak chamber pressure value derived from said captured peak electrical signal output by the signal processing means.

12. Apparatus as claimed in claim 1 wherein said signal processing means is connected to an output signal display means formed and arranged for displaying the peak chamber pressure obtained in use of the apparatus.

13. Apparatus as claimed in claims 12 wherein said display means is selected from an analogue meter, a digital display, and a graphic display.

14. Apparatus as claimed in claim 1 wherein said signal processing means comprises a dedicated self-contained integrated signal processing device provided with data input means and data display means.

15. Apparatus as claimed in claim 1 wherein said releasable mounting means is formed and arranged for rigidly securing said accelerometer to a telescopic sight provided on said firearm.

16. A method of deriving the peak chamber pressure of a given firearm using a given ammunition wherein said method comprises the steps of:
   (a) providing an apparatus according to claim 1;
   (b) rigidly securing the accelerometer of said apparatus to a said firearm in proximity to the chamber thereof;
   (c) loading said firearm with a said ammunition;
   (d) discharging said firearm;
   (e) capturing a peak voltage output signal from the accelerometer device; and
   (f) processing said peak voltage output signal so as to convert it into a value which is representative of the peak chamber pressure value.

17. A method as claimed in claim 16 wherein a conversion relationship given by formula (I):

$$V = \frac{P\pi q d^2}{4 M_f} \cdot \left(\frac{M_A}{M_A + 0.5L}\right) \qquad (I)$$

where
V=peak output voltage from the accelerometer;
P=peak chamber pressure;
π=3.1415;
q=sensitivity of the accelerometer;
d=bore diameter of the given firearm;
$M_f$=mass of the given firearm including the mass of all rigid attachments;
$M_A$=mass of the given ammunition bullet or projectile; and
L=powder mass of the given ammunition, and is used to derive a value representative of the peak chamber pressure P of said firearm using said ammunition during discharge of said firearm.

18. A method as claimed in claim 17 wherein said firearm is held by a user so that when the firearm is discharged the recoil force generated thereby is not substantially attenuated by a said user holding the firearm.

19. A method as claimed in claim 17 wherein said firearm is rigidly clamped to a freely movable trolley or carriage so that when the firearm is discharged, the recoil force generated thereby is not substantially attenuated by said freely moveable carriage or trolley, during the initial "recoil" phase of the discharge where the firearm recoils as a result of a pressure pulse created by detonation of the power charge of the ammunition.

20. A method as claimed in claim 19 wherein the mass of said trolley or carriage is included in the term $M_f$ of formula (I) in addition to the mass of said firearm.

21. Apparatus according to claim 1 wherein said releasable mounting means is secured to said firearm.

22. Apparatus according to claim 21 wherein said firearm is a regular handgun or rifle.

23. Apparatus according to claim 22 wherein said firearm is provided with a telescopic sight, and said releasable mounting means is formed and arranged for rigidly clamping said accelerometer to said telescopic sight of said firearm.

24. Apparatus according to claim 22 wherein said firearm is provided with a telescopic sight mounting and said releasable fastening means comprises a telescopic sight mounting connector.

25. Apparatus according to claim 22 wherein said accelerometer is mounted on the rear side of a support body selected from a gunsight, a gunsight mounting, and a trigger guard, and said releasable mounting means comprises at least one of an adhesive, adhesive tape, a securing strap, hook and loop fastener, wax, a magnetic clamp, and a suction clamp.

* * * * *